(12) United States Patent
von Thienen

(10) Patent No.: US 10,120,870 B2
(45) Date of Patent: Nov. 6, 2018

(54) SYSTEM AND METHOD FOR SEARCHING DISTRIBUTED FILES ACROSS A PLURALITY OF CLIENTS

(71) Applicant: Noggle AG, Jesteburg (DE)

(72) Inventor: Lars von Thienen, Jesteburg (DE)

(73) Assignee: Noggle AG, Jesteburg (DE)

( * ) Notice: Subject to any disclaimer, the term of this patent is extended or adjusted under 35 U.S.C. 154(b) by 547 days.

(21) Appl. No.: 14/880,243

(22) Filed: Oct. 11, 2015

(65) Prior Publication Data

US 2017/0103083 A1   Apr. 13, 2017

(51) Int. Cl.
*G06F 17/30* (2006.01)

(52) U.S. Cl.
CPC .. *G06F 17/30106* (2013.01); *G06F 17/30194* (2013.01); *G06F 17/30321* (2013.01)

(58) Field of Classification Search
CPC .......... G06F 17/30106; G06F 17/30194; G06F 17/30321
USPC ........................................................ 707/711
See application file for complete search history.

(56) References Cited

U.S. PATENT DOCUMENTS

| | | | |
|---|---|---|---|
| 6,728,733 B2 | 4/2004 | Tokui | |
| 8,214,422 B1 | 7/2012 | Woodward et al. | |
| 8,219,544 B2 | 7/2012 | Bluger et al. | |
| 8,612,439 B2 | 12/2013 | Prahlad et al. | |
| 8,909,943 B1 | 12/2014 | Shankar et al. | |
| 9,015,281 B2 | 4/2015 | Moffat | |
| 9,342,705 B1 * | 5/2016 | Schneider | H04L 9/14 |
| 2003/0188156 A1 | 10/2003 | Yasala et al. | |
| 2005/0050028 A1 | 3/2005 | Rose et al. | |
| 2007/0033191 A1 | 2/2007 | Hornkvist et al. | |
| 2008/0015999 A1 | 1/2008 | Ali et al. | |
| 2008/0071804 A1 * | 3/2008 | Gunda | G06F 17/30168 |
| 2009/0063448 A1 * | 3/2009 | DePue | G06F 17/30864 |
| 2009/0164475 A1 | 6/2009 | Pottenger | |

(Continued)

FOREIGN PATENT DOCUMENTS

| | | |
|---|---|---|
| JP | 2005202825 | 7/2005 |
| WO | 2015055762 A1 | 4/2015 |

OTHER PUBLICATIONS

International Search Report and Written Opinion of the International Searching Authority, International Patent Application PCT/IB16/56070, dated Feb. 16, 2017.

(Continued)

*Primary Examiner* — Evan Aspinwall
(74) *Attorney, Agent, or Firm* — Smartpat PLC

(57) ABSTRACT

A system for searching files across clients includes a server coupled to multiple clients. A first client creates a first index of files that are stored on the first client and uploads the first index to the server. A second client creates a second index of files that are stored on the second client. The second client downloads the first index from the server and executes a search across the first index and the second index. A method for searching files across clients includes generating and storing on a first client an index of locally stored files; uploading the index from the first client to a server; storing the index on the server; downloading the index from the server to the second client; and performing a search for files stored on the first client by querying the index downloaded onto the second client.

4 Claims, 4 Drawing Sheets

(56) References Cited

U.S. PATENT DOCUMENTS

| | | |
|---|---|---|
| 2010/0121856 A1* | 5/2010 | Lei .................. G06F 17/30091 |
| | | 707/747 |
| 2010/0185852 A1 | 7/2010 | Ogawa et al. |
| 2011/0145593 A1 | 6/2011 | Auradkar |
| 2012/0192055 A1 | 7/2012 | Antebi et al. |
| 2013/0031155 A1 | 1/2013 | Terrano et al. |
| 2013/0110825 A1 | 5/2013 | Henry |
| 2013/0185810 A1 | 7/2013 | Suchter et al. |
| 2013/0254537 A1 | 9/2013 | Bogorad |
| 2013/0283060 A1 | 10/2013 | Kulkarni et al. |
| 2013/0326019 A1* | 12/2013 | Haff ...................... H04L 29/06 |
| | | 709/217 |
| 2014/0068254 A1 | 3/2014 | Scharf et al. |
| 2014/0201154 A1 | 7/2014 | Varadharajan et al. |
| 2015/0220516 A1 | 8/2015 | French |
| 2015/0222625 A1 | 8/2015 | Ford et al. |

OTHER PUBLICATIONS

International Preliminary Report on Patentability in related international patent application PCT/IB2016/056070.

* cited by examiner

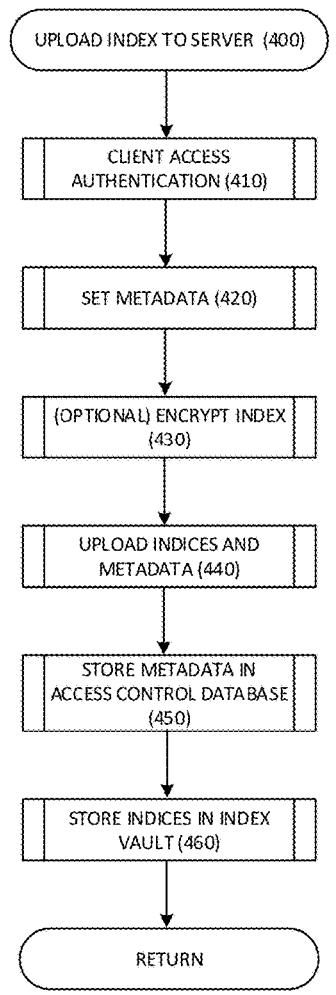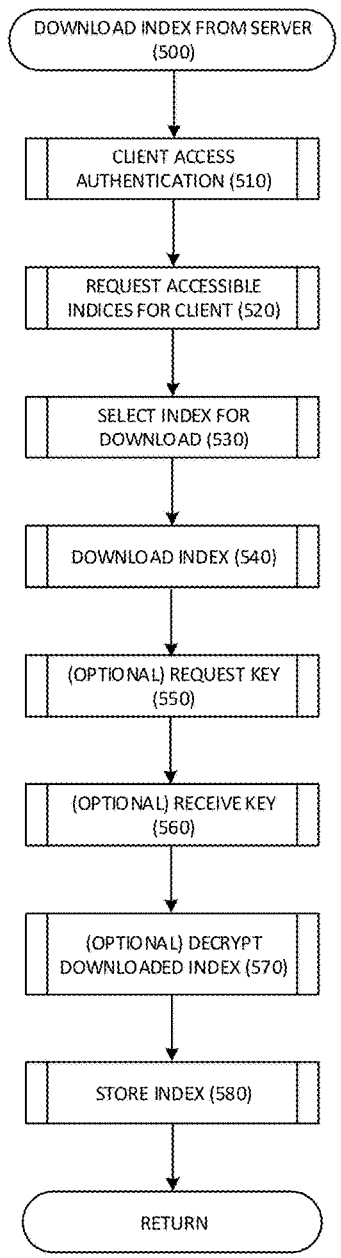
FIG. 4
FIG. 5

SYSTEM AND METHOD FOR SEARCHING DISTRIBUTED FILES ACROSS A PLURALITY OF CLIENTS

TECHNICAL FIELD

The present application relates to methods and systems for indexing files and for searching files across a plurality of clients.

BACKGROUND

Many situations exist in which multiple users generate electronic files on a plurality of client computers that are connected to a network. The users frequently store their files locally on different storage locations only accessible via their local client computers. Locally stored files are generally not accessible to other users, causing duplication of work and other inefficiencies that could be avoided, if users were able to locate files on other user's devices.

Search engines such as Google, Yahoo, or Bing are known which crawl files from a plurality of clients, generate a central index, and allow the central index to be queried by clients. These search engines are based on having access to the locally stored files, which is not desirable in a business environment, where locally stored files may contain sensitive content, and where each user of a client computer may want to control which other clients can search through its locally stored or only locally accessible files.

It is generally known to provide methods and computer programs for searching files across multiple clients. Examples of such methods and systems are described in the U.S. Pat. Nos. 8,219,544 and 8,612,439, which are hereby incorporated herein by reference in their entireties.

The use of encryption methods in distributed data sharing systems is generally known. Examples of utilizing encryption in distributed data sharing systems are described in the U.S. Pat. Pub. 2010/0185852 and U.S. Pat. No. 9,015,281, which are hereby incorporated herein by reference in their entireties.

SUMMARY

A system for searching files across a plurality of clients includes an index generator which is provided on each client and configured to create an index of one or more files that are stored on the respective client. The system further comprises a server in communication with each of the clients. The server includes an index vault for storing indices which are uploaded from clients to the server. One client may download an index of another client from the index vault. The clients may include a search routine which allows text-based searches across locally generated and downloaded indices, providing search results including locally stored files and files stored on another client.

More specifically, a system for searching files across a plurality of clients may be based on a server coupled to a plurality of clients through a network. A first client ("sharing client") is configured to create a first index of files that are stored on the first client and to upload the first index to the server. A second client ("seeking client") is configured to create a second index of files that are stored on the second client and to download the first index from the server. The second client may then execute a text-based search across the first index and the second index, thus allowing the second client to identify files of interested that are stored on the first client.

The first client may be configured to encrypt the first index with a first key before uploading the first index to the server. The second client may be configured to decrypt the first index with the first key. Preferably, the first client exchanges the first key with the second client such that the first key is not accessible to the server.

The server may comprise an access control database, and the first client may grant permissions in the access control database as to which other clients may download the first index. The second client can download the first index only if the access control database indicates that the first client has granted permission to do so.

The second client (seeking client) may provide a user interface allowing a user of the second client to send a request to access a file stored on the first client to a user of the first client.

A method for searching files across multiple clients includes generating and storing an index for local files of each client, uploading a local index to a server, and permitting a subset of other clients to access the uploaded index, downloading one or more accessible indices from the server by a client, searching one or more keywords by a client in a local index and/or optionally a downloaded index, outputting a search results including locally stored files and files stored on another client.

More specifically, the method for searching files across multiple clients may include coupling a server to communicate over a network with a plurality of clients. The plurality of client may comprise at least a first client that contains locally stored files, and a second client seeking information within the files of the first client. The method provides for generating and storing on the first client an index of the locally stored files and uploading the index from the first client to the server and storing the index in an index vault on the server. The method further includes downloading the index from the server to the second client and performing a search for files stored on the first client by querying the index downloaded onto the second client.

The method may further comprise providing a user interface on the first client for selecting a subset of files stored on the first client to be included in the index of the locally stored files. To improve security the method may include encrypting the index of the locally stored files with an encryption key in the first client before uploading the index to the server and exchanging the encryption key between the first client and the second client without storing the encryption key on the server. In that case the method requires decrypting, on the second client, the index downloaded from the server with the encryption key received from the first client.

To control access of information contained in locally stored files the method may comprise generating meta data on the first (sharing) client identifying which other (seeking) clients are authorized to access the index generated by the first (sharing) client and uploading the meta data from the first client to the server. The server may process the meta data and maintain an access control database which associates index files with an identity of clients authorized to download the index files. The server authenticates the second client and allows the second client to download the index file generated by the first client only if the meta data in the access control database identifies the second client as an authorized user.

Preferably, a seeking client becomes aware only of indices that it is authorized to access. This is achieved by creating on the server a list of shared index files that the second client is authorized to access by querying the access control database and downloading from the server to the second client the list of shared index files. A user interface on the second client is then provided to select index files from the list of shared index file for download. A user interface on the second client further allows a user to enter keywords for performing the search for files stored on the first client and displays search results on the second client in form of text. Search results may alternatively be displayed in form of a knowledge map.

The disclosed system and method may be implemented using a computer program product which comprises a non-transitory computer-usable medium in which a computer-readable program is stored. The program, when executed by a first client, generates and stores on the first client an index of locally stored files, and uploads the index from the first client to a server. The program, when executed by a second client, downloads the index from the server to the second client and performs a search for files stored on the first client.

In a secure version the program, when executed by a first client, encrypts the index with a key. When executed by a second client the program decrypts the index with the key. The key is preferably exchanged directly from the first client to the second client and not stored on the server.

The computer program product may also generate meta data which other clients the index may be shared with and communicated the meta data to the server. The program, when executed by a second client, may retrieve from the server a list of index files that are being shared with the second client and performs a search only across downloaded index files that are being shared with the second client.

The program, when executed by a second client, may generate and store on the second client a second index and performs a search for files stored on the first client and for files locally stored on the second client.

The following detailed description of the invention is merely exemplary in nature and is not intended to limit the invention or the application and uses of the invention. Furthermore, there is no intention to be bound by any theory presented in the preceding background of the invention or the following detailed description of the invention.

BRIEF DESCRIPTION OF THE DRAWINGS

Referring now to the drawings wherein the showings are for the purpose of illustrating certain exemplary embodiments only and not for limiting the same. A system and a method for searching files across multiple clients are disclosed.

FIG. 4 is a flowchart illustrating a routine for uploading the index from a client to a server.

FIG. 5 is a flowchart illustrating a routine for downloading an index from the server to a client.

DETAILED DESCRIPTION

The term "client" refers to a computing device such as a desktop computer, a laptop computer, a smartphone, a media player, or the like that is locally accessed by a user. A user may be an individual. It is noted that the individual could be among a group of individuals who share a client.

The term "local" in context of a client file refers to any file physically stored in a memory unit of the respective client or a connected memory unit accessible from the respective local client. The term "local" in context of a client program refers to an executable program having an executable program code being stored in the client and being executed on one or more computing processors all of them physically placed inside the respective client.

The term "computer network" refers to an internet cloud, local private network, corporate virtual private network or the like.

The term "index" refers to information that is generated in order to ease finding of information associated with one or more files. A typical index includes information related to a presence of keyword in a file.

The term "index generator" refers to a computer program which takes one or more files as input and generates one or more indices.

The term "search routine" refers to a computer program which takes a limited number of keywords as input and uses one or more indices in order to output search results.

The term "keyword" refers to a word which is a subject to a search activity.

The term "security module" refers to a computer program implementing an encryption and a decryption services. The term "key" refers to digital information required by a security module to decrypt an encrypted file.

The term "meta data" refers to any information a client exchanges with the server excluding an index, e.g. a client defining which other clients may download an index created by the client.

Figure 1:
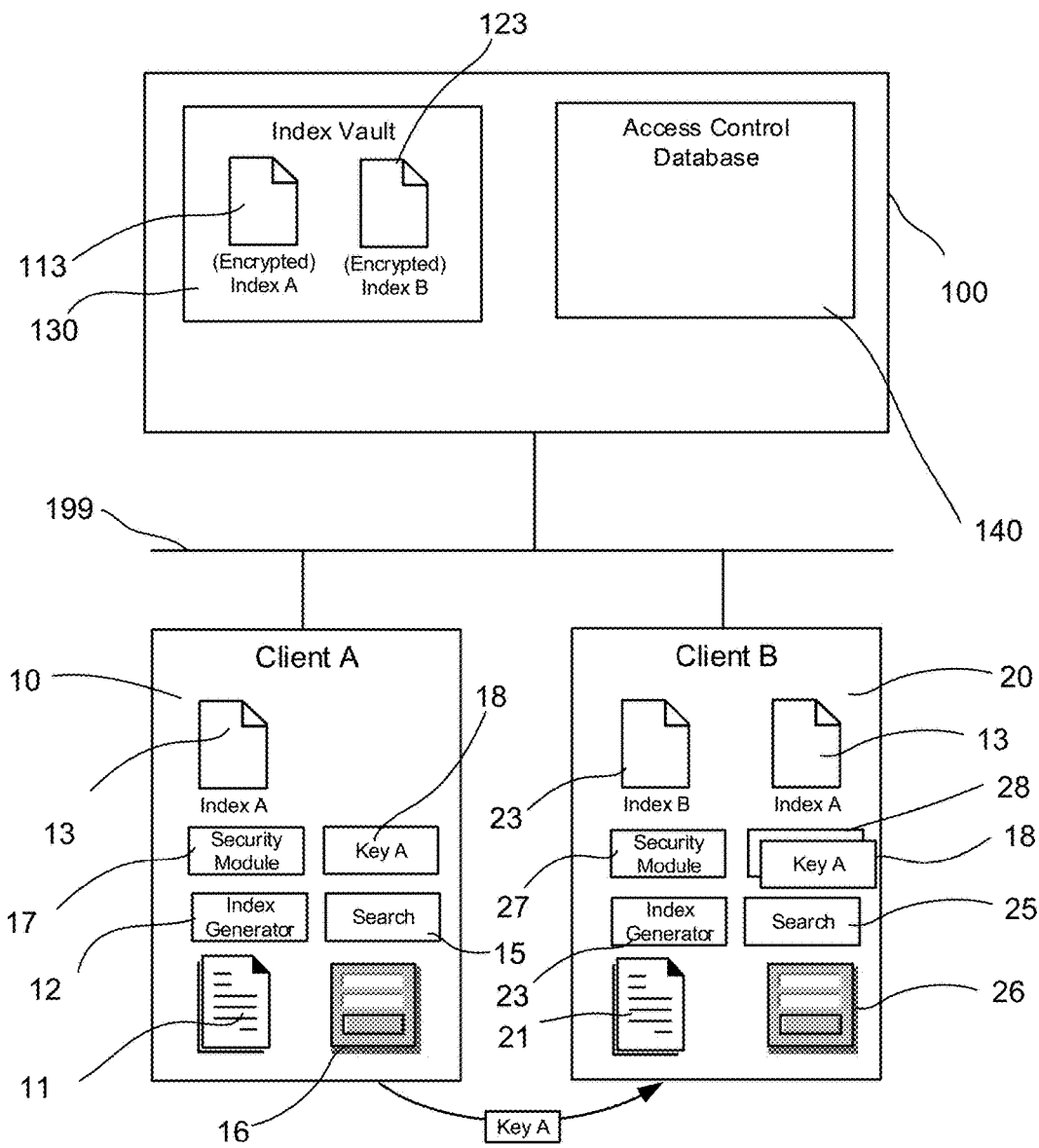
FIG. 1 is a block diagram schematically illustrating an exemplary system for searching files across multiple clients.

An exemplary system for searching files across multiple clients, as shown in FIG. 1, includes a server computer 100 and a plurality of clients 10, 20. A first client ("A") 10 and a second client ("B") 20 are interactively connected via a computer network 199. The first client 10, in this example, is willing to share local files with the second client 20. The first client 10 may be referred to as a "sharing client". The second client 20 is searching for files. The second client 20 may hence be referred to as a "seeking client". It should be understood that in practice, each client can be both a "sharing client" and a "seeking client".

The sharing client 10 has a plurality of local files 11 e.g. personal or organizational textual based information. A local index generator 12 crawls and indexes the local files 11 and generates a first index 13. The action of generating the first index 13 can be nonrecurring or recurring. The local files 11 may be stored inside a memory component such e.g. as a hard disk drive of flash memory component that is physically located inside the sharing client 10 or connected to the sharing client 10.

Similarly, the second client 20 has a plurality of local files 21 e.g. personal or organizational textual based information. A local index generator program 22 crawls and indexes the local files 21 and generates a second index 23. The action of generating the second index 23 can be nonrecurring or recurring.

The server computer 100 includes an index vault 130 being a container of indices that are uploaded from clients and which can be downloaded to clients. FIG. 1 depicts that a copy of the first index 13 and a copy of the second index 23 have been uploaded from the first client 10 and the second client 20 to the index vault 130. The upload of the first index 13 and the second index 23 to the index vault 130 can be recurring or nonrecurring. It is noted that the copy of the first index 13 may or may not be identical to the original index 13 locally generated and stored in first client 10. The server computer 100 further includes an access control database 140. The access control database 140 controls which client has the privilege to access and download an index present in the index vault 130. A client uploading an index to the server may send meta data along the uploaded index, the meta data defining which client or clients may download the index of the respective client from the server 100. That is, the sharing client 10 here controls which seeking client 20 is allowed to search through its local files 11. Only those seeking clients 20 that have been authorized by the sharing client 10 are able to download the first index 13 from the server 100. Even after the first index 13 has been downloaded to the second client 20, software in the second client 20 may verify by querying the server 100 that the second client 20 is still authorized to access the first index 13. The seeking client 20 may execute searches across the first index 13 of the sharing client 10 only if the server 100 confirms that the seeking client 20 is still authorized to do so.

The seeking client 20 further includes a computer program 26 locally stored and executed. A user of the seeking client 20 may request the download of the first index 13 from the index vault 130 of the server 100. Because the sharing client 10 has given the download privilege to the seeking client 20 the access control database 140 approves the download of the first index 13 from index vault 130 to the seeking client 20. A copy of the first index 13 then is stored locally in seeking client 20.

Vice versa, using a computer program 16 locally stored and executed on first client 10 a user of the first client 10 may request the download of the second index 23 from the index vault 130 of the server 100. If the second client 20 has not given download privilege to the first client 10 the access control database 140 does not approve the download of the second index 23 from the index vault 130 to the first client 10. The access control database 140 may be used to control, which clients are even informed of the presence of a copy of an index file of another client in the index vault 130. Only those clients authorized to access the second index file 23 would then be able to see that such a second index 23 is present in the index vault 130.

The first client 10 further includes a search routine 15. A user of the first client 10 may search in the first index 13 only. The search routine 15 being executed on the first client 10 outputs search results. Similarly, the second client 20 further includes a search routine 25. A user of the second client 20 may search in any subset of the first index 13 and the second index 23. The search routine 25 being executed on the second client 20 outputs search results based on the selected subset of indices. The second client 20 may not possess the local files of first client 10. If the search result of the search routine 25 refers to the local file 11 of first client 10, then a user of the second client 20 may request to receive a copy of a local file 11 from the first client 10.

Utilization of an encryption method may ensure that an attacker cannot use an index 13, 23, even if the server 100 were to be compromised. In an improved embodiment for data security the first client 10 further includes a security module 17 which encrypts the first index 13 with a first key 18. The first key 18 is needed for decrypting the encrypted first index A 113. In the improved embodiment for data security the second client 20 further includes a security module 27. The security module 27 is used to encrypt the second index 23 with a second key 28. The second key 28 is needed for decrypting the encrypted second index 123. The first client 10 and second client 20 upload an encrypted copy 113 of the first index 13 and an encrypted copy 123 of the second index 23 to the server 100. In the improved embodiment for data security the second client 20 downloads the encrypted copy 113 of first index 13. The encrypted copy 113 of the first index 13 which is stored locally in second client 20 can only be used by the search routine 25 if decrypted by the security module 27 using the key 18 of first client 10. Upon request of the seeking client 20 to the sharing client 10, the sharing client 10 may send a copy of its key 18 to the seeking client 20. Preferably, the exchange of the key 18 occurs directly between the sharing client 10 and the seeking client 20, without storing the key 18 on the server 100.

In order to use a search system a user inputs a set of key words to the search system. A problem may arise when a user does not know a proper set of keywords to enter as input to the search system. In an improved embodiment with knowledge map the search routine 25 further generates a knowledge map besides search results; the knowledge map illustrating a linguistics cluster of all words of all files being listed in the search results. A user of the search routine 25 may use the generated knowledge map to determine which other keywords should be added to the set of keywords to improve the search results.

Figure 2:
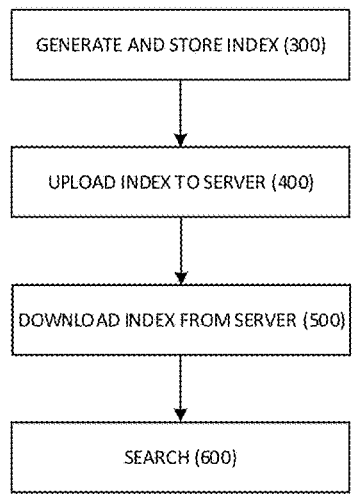
FIG. 2 is a flowchart illustrating a routine for searching files across multiple clients.

A set of program steps for searching files across multiple clients is illustrated in FIG. 2. Searching files across multiple clients in accordance with this application includes generating and storing an index locally 300, uploading the index from a client to a server 400, downloading an index from the server 500, and search 600. The sequence shown in FIG. 2 is an exemplary sequence and it is not intended to limit this application to the sequence illustrated in FIG. 2.

Figure 3:
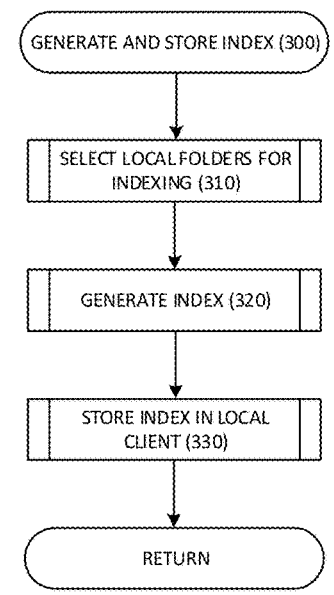
FIG. 3 is a flowchart illustrating a routine for generating and storing an index locally.

FIG. 3 shows the sub routines of generating and storing an index locally 300. Generating and storing an index locally 300 includes selecting a set of local files for indexing 310, generating the index 320, and storing the index locally 330. In the step selecting a set of local files for indexing 310 a user may select a set of files on a client. A user may decide to create multiple indices to separate for example an index of personal files from an index of company files. Generating the index 320 generates one or more indices by for example crawling the whole content of the selected files of the previous step 310. In the step of store index in local client 330 all generated indices are stored in a local memory of the same client where generated, e.g. a local hard disk.

FIG. 4 shows the sub routine of uploading the index from a client to a server 400 e.g. an internet cloud server. Uploading the index from a client to a server 400 includes authenticating a client 410, setting meta data 420, optionally encrypting the index 430, uploading the index and the meta data to the server 440, storing the meta data in an access control database 450, and storing the index in an index vault 460. In the authenticating a client step 410 a client may use a user ID and password or any other authentication method to be authorized for communicating with the server. In the setting metadata step 420 a user may choose which local indices to upload and which clients have a privilege to download the indices from the server. In the optional encryption step 430 a client may utilize an encryption routine to encrypt the chosen indices prior to upload. In the upload step 440 the indices and the meta data, e.g. information who can access any given index, are uploaded to the server. In the meta data storage step 450 the meta data uploaded to the server is stored in an access control data base, the access control data base keeping track of which index can be accessed and downloaded by which client. In the index storage step 460 the uploaded indices are stored in an index vault on the server.

FIG. 5 shows the sub routine of downloading an index from the server 500. Downloading an index from the server 500 includes authenticating a client 510, requesting a list of accessible indices for the client 520, selecting an index for download 530, downloading the index 540, optionally requesting a key 550, optionally receiving the key 560, optionally decrypting the downloaded index 570, and storing the index 580. In the authentication step 510 a client may use a user ID and password or any other authentication method to get the authorization for communicating with the server if needed. In index request step 520 the client requests a list of indices which are accessible for the client based on the meta data sent with the index to the server. In download selection step 530 the client selects an index from the list indices generated by the previous step 520. In the download step 540 the selected index is downloaded from the server to the client. In the optional key request step 550 a request for encryption key may be sent by the downloading (seeking) client to the sharing client which uploaded the index, this step being necessary only if the optional encryption step 430 is applied by the sharing client. In the optional key receiving step 560 the client may receive the requested key from the sharing client if the optional key request step 550 is applied. In the index decryption step 570 the received key is used to decrypt the downloaded index. In the index storage step 580 the index is stored to the local memory of the seeking client. This group of downloaded indices in a client is referred to as "shared" indices.

Figure 6:
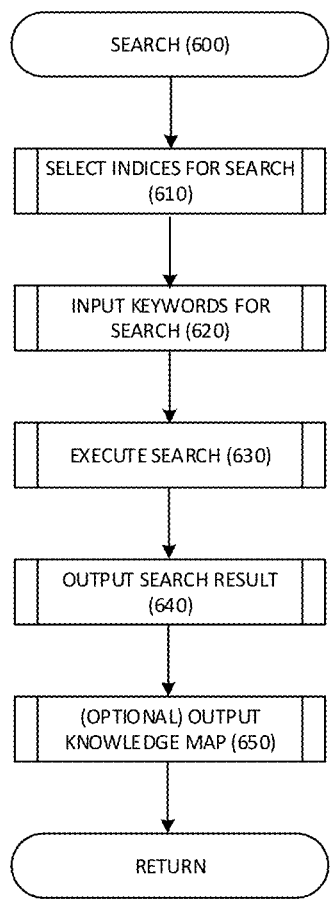
FIG. 6 is a flowchart illustrating a searching routine for searching files across multiple clients.

FIG. 6 shows the sub routine of searching 600. Searching 600 includes selecting a set of indices for search 610, inputting keywords for search 620, executing a search 630, outputting search results 640, and optionally outputting a knowledge map 650. In index selection step 610 a user of a seeking client may select any subset of local and shared indices stored inside the seeking client to be used during a search. In the keyword entry step 620 a user of a client inputs one or more keywords for search. In the optional knowledge map output step 650 a knowledge map is outputted, the knowledge map being a linguistic cluster of all words inside the listed search result. The knowledge map may help a user to improve the list of keywords entered in the keyword entry step 620 and repeat the search execution step 630 to improve the search results of the search result display step 640. A knowledge map preferably illustrates how often a term is used in the documents listed in the search results. This information may lead a user toward a better suited set of keywords for search.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A method for searching files across multiple clients, comprising:
coupling a server to communicate over a network with a plurality of clients, the plurality of client comprising at least a first client that contains locally stored files, and a second client seeking information within the files of the first client;
generating and storing on the first client an index of the locally stored files;
uploading the index from the first client to the server;
storing the index in an index vault on the server;
generating meta data on the first client identifying which other clients are authorized to access the index generated by the first client;
uploading the meta data from the first client to the server;
processing the meta data on the server and maintaining an access control database on the server which associates index files with an identity of clients authorized to download the index files;
authenticating the second client by the server;
allowing the second client to download the index file generated by the first client only if the meta data in the access control database identifies the second client as an authorized user;
creating on the server a list of shared index files that the second client is authorized to access by querying the access control database;
downloading from the server to the second client the list of shared index files;
providing a user interface on the second client to select index files from the list of shared index file for download;
downloading the index from the server to the second client;
providing a user interface on the second client allowing a user to enter keywords for performing the search for files stored on the first client;
performing a search for files stored on the first client by querying the index downloaded onto the second client; and
displaying search results on the second client in form of text.

2. The method as in claim 1, further comprising providing a user interface on the first client for selecting a subset of files stored on the first client to be included in the index of the locally stored files.

3. The method as in claim 1, further comprising:
encrypting the index of the locally stored files with an encryption key in the first client before uploading the index to the server;
exchanging the encryption key between the first client and the second client without storing the encryption key on the server; and
decrypting, on the second client, the index downloaded from the server with the encryption key received from the first client.

4. A method for searching files across multiple clients, comprising:
coupling a server to communicate over a network with a plurality of clients, the plurality of client comprising at least a first client that contains locally stored files, and a second client seeking information within the files of the first client;
generating and storing on the first client an index of the locally stored files;
uploading the index from the first client to the server;
storing the index in an index vault on the server;
generating meta data on the first client identifying which other clients are authorized to access the index generated by the first client;
uploading the meta data from the first client to the server;
processing the meta data on the server and maintaining an access control database on the server which associates index files with an identity of clients authorized to download the index files;
authenticating the second client by the server;

allowing the second client to download the index file generated by the first client only if the meta data in the access control database identifies the second client as an authorized user;

creating on the server a list of shared index files that the second client is authorized to access by querying the access control database;

downloading from the server to the second client the list of shared index files;

providing a user interface on the second client to select index files from the list of shared index file for download;

downloading the index from the server to the second client;

providing a user interface on the second client allowing a user to enter keywords for performing the search for files stored on the first client;

performing a search for files stored on the first client by querying the index downloaded onto the second client; and displaying search results on the second client in form of a knowledge map.

\* \* \* \* \*